United States Patent [19]

Spange et al.

[11] 3,808,019
[45] Apr. 30, 1974

[54] PROCESS FOR THE PREPARATION OF PIGMENT COMPOSITIONS FOR COLORING POLYOLEFINS

[75] Inventors: Arno Spange, Frankfurt/Main; Reinhold Deubel, Altenhain/Taunus, both of Germany

[73] Assignee: Farbwerke Hoechst Aktiengesellschaft vormals Meister Lucius & Bruning, Frankfurt/Main, Germany

[22] Filed: Jan. 24, 1973

[21] Appl. No.: 326,384

[30] Foreign Application Priority Data

Jan. 29, 1972 Germany.......................... 2204223

[52] U.S. Cl............. 106/271, 106/272, 106/308 B
[51] Int. Cl............................................. C08h 9/06
[58] Field of Search............................ 106/271, 270

[56] References Cited
UNITED STATES PATENTS

| | | |
|---|---|---|
| 3,723,153 | 3/1973 | Nagata et al...................... 106/272 |
| 3,454,513 | 7/1969 | Azarian............................ 106/308 B |
| 2,296,618 | 9/1942 | Patterson........................ 106/308 B |
| 3,607,337 | 9/1971 | Offenbach........................ 106/272 |

OTHER PUBLICATIONS

Vol. 59 8943e, Copy in Chem. Library.

*Primary Examiner*—Theodore Morris
*Attorney, Agent, or Firm*—Curtis, Morris & Safford

[57] ABSTRACT

A process for the preparation of pigment compositions, which comprises adding to the pigments an aqueous solution of an alkali metal silicate and a polyethylene dispersion and working up the mixture in a manner usual for pigments. The pigment compositions thus obtained are useful for coloring polyethylene films and sheets or for dyeing polyolefins in a spinning solution. The compositions show an excellent pigment distribution and tinctorial strength which is substantially better than those of compositions prepared without the addition of alkali metal silicates.

5 Claims, 1 Drawing Figure

1 MICRON

PROCESS FOR THE PREPARATION OF PIGMENT COMPOSITIONS FOR COLORING POLYOLEFINS

The present invention relates to a process for the preparation of pigment compositions suitable for coloring polyolefins.

Thermoplastic material is generally colored by means of inorganic or organic pigments. In many cases, however, incorporation of pulverulent pigments in the plastic material involves, in practice, certain difficulties that result from insufficient dispersibility of the pigment in the material to be colored. In such cases, unlevel mostly faint colorations containing dots are obtained. Therefore, plastic material is generally colored with products made from pigments and a suitable carrier material, which contain the pigments in a more easily dispersible form. They afford, in many cases, a better coloration of the plastics. Several methods are known for preparing such products, which are differently called pigment concentrates, master batches, pigment dispersions or pigment compositions.

Thus, it has been known for a long time that the kneading of pigment powders with suitable carrier materials yields pigment compositions to be used for various fields of application. This method, however, requires high apparatus expenditure since it involves expensive kneading devices.

British Patent No. 954 938 and German Patent No. 1 156 761 disclose further methods for preparing pigment compositions. They start from finished pigments which are finely dispersed by wet grinding or dispersed in the presence of an organic dispersing agent before being converted into compositions. These methods require additional process steps and are therefore also rather expensive from the technical point of view.

A technically simple method for preparing azo pigment compositions suitable for the coloration of polyvinyl chloride is disclosed in German Offenlegungsschrift No. 1 644 210. According to this method, the preparation of the composition coincides with the preparation of the pigment dyestuffs so that a separate preparation of the composition is no longer necessary. On principle, this method is also suitable for the preparation of pigment compositions appropriate for the coloration of polyolefins. In order to get, however, the usually desired pigment concentrations, these compositions must be used in such an amount that a satisfactory dispersion in polyolefins is not obtained. This is a particular disadvantage for the coloration of polyolefin films and sheets, since coloration of such material has to meet with highest demands as to fine division of the pigments in the plastics. These materials must not contain coarse pigment agglomerates nor pigment grit, which would deteriorate the transparency of the films and sheets.

It has now been found that color intensive pigment compositions, which are very easily dispersible in polyolefins, can be prepared by adding, during the preparation or formation of organic or inorganic pigments, small amounts of a water-soluble alkali metal silicate and a dispersed or suspended ethylene polymer and working up this mixture in a manner usual for pigments.

As silicates to be used according to the process of the invention, there are suitable water-soluble alkali metal silicates either in solid form or as aqueous solutions, preferably commercial sodium and potassium silicate solutions. The silicate content of these solutions corresponds to a molar ratio of $SiO_2:Na_2O$ or $K_2O$ of from 1:1 to 4:1, for example sodium silicates of 37° to 40°Bé or of 58° to 60°Bé, having a molar ratio of $SiO_2:Na_2O$ of about 3.4 or about 2.1, or potassium silicates of 35°Bé or 42°Bé, having a molar ratio of $SiO_2:K_2O$ of about 3.8 or about 3.2. The amount of silicate required depends, above all, on the silicic acid content of the alkali metal silicate solution used; it may vary within wide limits and ranges, preferably, from 2 to 10 percent of commercial alkali metal silicate solution, calculated on the finished pigment composition.

As carrier materials, there are suitable polyethylenes having a low to medium molecular weight, i.e. from about 2000 to 30,000. These polymers are obtained by dispersion polymerization of ethylene or by dispersion of oxidized polyethylenes of low molecular weight in water or in aqueous solution in the presence of dispersing agents. The carrier material is added in an amount of from 5 to 95, preferably from 30 to 80, per cent by weight, calculated on the weight of the finished composition.

The process is suitable for making compositions of inorganic and organic pigments which are prepared or formed in purely aqueous systems or in aqueous systems containing organic solvents, for example azo pigments, perylene-tetracarboxylic acid pigments or napthalene-tetracarboxylic acid pigments, dioxazines, quinacridones, indigoids, anthraquinone dyestuffs, cadmium and chromium pigments, iron oxide and titanium dioxide pigments.

The method for preparing the composition depends, to a large extent, on the preparation or formation and on the after-treatment processes of the pigment to be treated and has therefore to be carried out differently. In the case of azo pigments, the silicate and the polymerization dispersion are added in the course of coupling or prior to or after the thermal after-treatment carried out in usual manner. As to organic pigments which are finely divided by grinding them with salts in dry state or in wet state, the silicate and the polymer dispersion are added prior to or after aqueous extraction of the salts or prior to or after fine division. In the case of naphthalene-tetracarboxylic acid, dioxazine, quinacridone and phthalocyanine pigments, the composition is made with silicates and polymer material during the preparation or formation processes, for example while heating them in aqueous or solvent-containing systems in order to produce the pigment grain or the desired crystal modification, or during the hydrolysis of salts or salt-like addition compounds as well as during re-dissolution of the pigments. Compositions of inorganic pigments are prepared during or after precipitation of the pigment or during or subsequent to the after-treatment.

The composition is worked up by adding a substance, having a coagulating effect, to the mixture of pigment, silicate and carrier material, optionally while heating additionally. Depending on the pigment, the coagulating substances may be mineral acids and/or water-soluble salts, preferably salts of polyvalent cations. The compositions are isolated in a manner usual for the pure pigment, by suction-filtration, washing, drying and grinding.

Especially when incorporated for coloring polyethylene films and sheets or for dyeing polyolefins in a spinning solution, the compositions prepared according to the invention shown an excellent pigment distribution and tinctorial strength which is substantially better than those of compositions prepared without the addition of alkali metal silicates. Moreover, the process allowing the composition to be made during the preparation and formation operations of the pigments can be carried out in an economic manner on an industrial scale and does not require any special process step. This method is especially suitable for obtaining pulverulent pigment compositions and is gaining more and more importance owing to the increasing use of polyolefin material in powder form. The preparation of such powder compositions from master batches hitherto obtained in kneaders by subsequent grinding would be expensive and problematic from a technical point of view. In contradistinction thereto, the compositions obtained according to the process of the invention have a soft texture and can be ground in a manner similar to pure pigments.

The following Examples illustrate the invention, the parts and percentages being by weight unless stated otherwise.

EXAMPLE 1

41.9 Parts of acetoacetylamino-(4-chloro-2,5-dimethoxy)benzene were dissolved in 150 parts of salt-free water and 21 parts of a 33 percent sodium hydroxide solution. One half of the solution was added dropwise while stirring to a solution cooled to about 10°C and consisting of 6.2 parts of acetic acid, 0.08 part of sodium triphosphate and 0.4 part of a product obtained by an addition reaction of 20 mols of ethylene oxide with 1 mol of stearyl alcohol, in 70 parts of water.

The pH-value of the precipitate of the coupling component thus obtained was adjusted to 5.4 by means of sodium hydroxide solution, and 1.1 parts of dimethyl-coco fatty acid amine oxide were added. To this mixture, a bisdiazonium salt solution obtained by diazotizing 9.7 parts of 3,3'-dichloro-4,4'-diamino-diphenyl in usual manner was added dropwise within about 1.5 hours, the pH of the mixture being maintained at 4.5, stirring was continued for 15 minutes, the pH was adjusted to 8 by means of sodium hydroxide solution, 5 parts of a commercial sodium silicate solution containing about 43 percent of silicate in a molar ratio of $SiO_2:Na_2O$ of about 2.5 were added, and the mixture was heated to 80° – 85° C for 1 hour. Subsequently, 182 parts of a dispersion obtained by dispersion polymerization and containing 35 percent of polyethylene having a medium molecular weight of 15,000 to 20,000 and 5 percent of potassium laurate and a particle size of 0.1 to 0.3 μm were added. After dilute hydrochloric acid had been added dropwise to this mixture until weakly acid reaction took place, this mixture coagulated. The coagulate was suction-filtered, washed to neutral with water, dried at 60°C and ground in usual manner. The composition contained 30 percent of pigment.

For a technological test of this composition, 30 parts of it were intimately mixed with 270 parts of colorless low density polyethylene granules suitable for the production of films. The mixture was conveyed via an extruder, the temperature zones of which were heated to 110° – 180°C, to a blow head and blown to a tubular film of a thickness of 20 to 25 μm.

A piece thereof, having a length of 5 m, was evaluated as to its color shade, color intensity and pigment distribution. The level coloration thus obtained was transparent and entirely free from dots. A composition, which had been prepared for comparison's sake from the second half of the solution of the coupling component in completely the same manner but without sodium silicate, provided a substantially fainter coloration of the film which contained numerous pigment dots of different size.

EXAMPLE 2

70 Parts of a mixture consisting of 20 percent of the pigment dye perylene-3,4,9,10-tetracarboxylic acid-di-(3',5'-dimethylphenyl)-imide and 80 percent of sodium sulfate and containing the pigment ground together with a salt were introduced into 500 parts of drinking water of medium hardness. The pH-value of the salt extract was adjusted to 8 by means of a dilute sodium hydroxide solution, 91 parts of a polyethylene dispersion as in Example 1 and then 2.5 parts of a commercial potassium silicate solution of 35°Bé were added. The mixture was stirred for 1 hour and rendered weakly Congo acid by means of dilute hydrochloric acid, stirring was continued for another 30 minutes, the coagulate was suction-filtered, washed to neutral with water and dried at 60°C. The product was then ground on a pinned disk mill to yield a finely pulverulent composition having a pigment content of 30 percent. This was excellently suitable for the coloration of polyethylene sheets and films, for example according to the method disclosed in Example 1. It yielded level transparent colorations practically free from dots.

A composition which had been prepared without an alkali metal silicate but under otherwise entirely identical conditions, however, provided colorations of films and sheets which contained considerable pigment dots and were therefore useless.

EXAMPLE 3

108 Parts of the potassium addition compound of the pigment Vat Orange 7 (C.I. No. 71105), having a pure pigment content of 37 percent, were introduced while stirring into 400 parts of drinking water of medium hardness, to which 6 parts of a commercial potassium silicate solution of 35°Bé had previously been added. The mixture was stirred for 15 minutes, and 156 parts of a polyethylene dispersion according to Example 1, then, dropwise, such an amount of 5N hydrochloric acid were added as was sufficient to bring about coagulation. Stirring was continued for half an hour and the coagulate was worked up as in Example 1. The pigment content of the composition was 40 percent. After being incorporated in polyethylene films according to Example 1, the product yielded highly transparent level colorations which were free from dots.

Using, however, a composition obtained, for comparison with this composition, in the same manner but without addition of potassium silicate by hydrolysis of the addition compound of the pigment, the colored polyethylene films and sheets had a weaker color intensity and contained pigment dots.

EXAMPLE 4

60 Parts of an aqueous dispersion obtained by the sulfuric acid process and having a content of 50 percent of titanium dioxide predominantly consisting of particles and agglomerates of 0.3 to 7.5 μm, were stirred with 200 parts of drinking water of medium hardness. The pH of the dispersion was adjusted to 8.5 by means of dilute sodium hydroxide solution, 2.5 parts of a commercial sodium silicate solution of the composition indicated in Example 1 were added, the mixture was stirred for 15 minutes and 52 parts of a polyethylene dispersion as used in Example 1 were added. After having stirred for about 15 minutes by means of a simple blade stirrer, 25 parts of 1N hydrochloric acid were added to this mixture. The coagulate obtained was worked up as in Example 1. The composition obtained having a pigment content of 60 percent yielded, upon incorporation in the polyethylene film as in Example 1, a level pure-white coloration of the film which was free from dots and had a smooth surface. When the coloration was made using a composition obtained from the same starting substances under the same conditions but without an alkali metal silicate, this had a substantially fainter shade and contained numerous minor and major pigment dots. The surface of the film was slightly rough.

EXAMPLE 5

The conditions according to Example 4 were modified in such a manner that the polyethylene dispersion was replaced by a polyethylene wax dispersion. This was obtained by introducing, while stirring, a hot melt of 2 parts of lauric acid and 18 parts of oxidized polyethylene wax having a medium molecular weight of 2000, a density of 0.93 to 0.95 g/cc., an acid number of from 23 to 28 and a saponification number of from 40 to 55, into a solution which had been heated to 95°C and consisted of 0.5 part of potassium hydroxide in 100 parts of salt-free water, and subsequently stirring was continued until the whole was cold. Compositions obtained therewith according to the method of Example 4 in the presence or absence of sodium silicate provided polyethylene colorations that correspond to those obtained according to Example 4.

EXAMPLE 6

216 Parts of lead nitrate, 62.1 parts of sodium bichromate, 14.7 parts of sodium sulfate, 10.8 parts of sodium chloride, 36.3 parts of a 45 percent sodium hydroxide solution, 2.2 parts of sodium carbonate, 32.8 parts of crystallized aluminium sulfate, 32.8 parts of a sodium silicate solution having a content of 27.2 percent of silicic acid and a molar ratio of $SiO_2:Na_2O$ of about 3.4, as well as 470 parts by volume of an antimony trifluoride solution in nitric acid, having a content of 25 g of antimony trioxide per liter, were reacted in known manner to yield a high-quality chromium-yellow pigment which was resistant to light and chemical substances. The pH-value of the aqueous pigment suspension obtained having a pigment content of 220 parts was adjusted to 8 by means of dilute sodium hydroxide solution and the suspension was mixed with 236 parts of a polyethylene dispersion as used in Example 1. By adding a 5 percent nitric acid until a pH of 6 was reached, the dispersion was broken. The product was heated to 80°C and, after having been cooled to 70°C, it was worked up as in Example 1. This composition having a pigment content of 70 percent provided polyethylene colorations, which had a smooth surface of the film, a good levelness and were entirely free from dots.

We claim:

1. An organic or inorganic pigment composition made by adding to the pigment 2 to 10 percent by weight of a water-soluble alkali metal silicate solution and 5 to 95 percent by weight of a polyethylene with a molecular weight of from 2000 to 30,000.

2. In a process for preparing an organic or inorganic pigment composition, the improvement which comprises adding to the pigment composition during its preparation about 2 percent to about 10 percent of water-soluble alkali metal silicate solution and about 5 percent to about 95 percent of a dispersed or suspended ethylene polymer of molecular weight about 2,000 to about 30,000, said amounts being by weight of the finished pigment composition.

3. A process improvement according to claim 2 wherein about 30 percent to about 80 percent of said ethylene polymer is added.

4. A process improvement according to claim 2 wherein said alkali metal silicate is potassium silicate or sodium silicate having a molar ratio of $SiO_2:Na_2O/K_2O$ of about 1:1 to about 4:1.

5. A process improvement according to claim 2 wherein said silicate solution is about 35° to about 60° Baume.

* * * * *